(12) United States Patent
Mack (10) Patent No.: US 6,427,555 B2
(45) Date of Patent: Aug. 6, 2002

(54) METHOD OF MAKING DRILL-CHUCK JAW WITH HARD-METAL INSERTS

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/791,091

(22) Filed: Feb. 22, 2001

(30) Foreign Application Priority Data

Feb. 23, 2000 (DE) .......................... 100 08 262

(51) Int. Cl.⁷ ............................. B21K 21/00
(52) U.S. Cl. .................. 76/101.1; 76/108.6; 29/469.5; 29/527.4; 29/460; 279/152
(58) Field of Search ................ 76/108.6, 101.1, 76/108.2; 29/469.5, 527.4, 460; 279/60, 62, 152, 153, 154

(56) References Cited

U.S. PATENT DOCUMENTS

| 928,180 | A | * | 7/1909 | Church | 279/60 |
| 3,807,745 | A | * | 4/1974 | Bent | 279/60 |
| 4,924,583 | A | * | 5/1990 | Hummel et al. | 29/460 |
| 4,951,955 | A | * | 8/1990 | Sakamaki | 279/62 |
| 4,955,623 | A | * | 9/1990 | Rohm | 279/60 |
| 5,044,643 | A | * | 9/1991 | Nakamura | 279/60 |
| 5,410,932 | A | * | 5/1995 | Moellering | 83/698.31 |
| 5,580,197 | A | | 12/1996 | Rohm | |
| 5,701,779 | A | | 12/1997 | Carter | |
| 5,765,839 | A | | 6/1998 | Rohm | |
| 5,829,761 | A | | 11/1998 | Rohm | |
| 6,227,549 | B1 | * | 5/2001 | Michel | 279/60 |

FOREIGN PATENT DOCUMENTS

EP 0566841 10/1993

* cited by examiner

Primary Examiner—M. Rachuba
Assistant Examiner—Jason Prone
(74) Attorney, Agent, or Firm—Herbert Dubno; Andrew Wilford (57) ABSTRACT

A drill-chuck jaw is made by first forming an elongated metal body with a toothed back face and a front face, then machining a longitudinally extending groove having sides and a floor in the front face, and forming inwardly projecting and longitudinally spaced retaining bumps on the groove sides. A hard-metal insert is fitted into the groove between the retaining bumps and then bonded to the body in the groove. the body is heat-treated, that is annealed, before machining the groove in it to reduce internal stresses. Then the body is cleaned and oiled to prepare it for machining and to eliminate any oxidation created by the heat treatment. After machining the body and before fitting the insert the body is deburred and cleaned again. Normally the insert is bonded to the body by soldering or brazing In order to allow the insert to seat directly on the jaw and not be held off it by the solder a channel is formed between the insert and the body in the groove. The insert is bonded to the body by filling the channel with the solder. The channel can be formed in the insert or in the body.

19 Claims, 8 Drawing Sheets

METHOD OF MAKING DRILL-CHUCK JAW WITH HARD-METAL INSERTS

FIELD OF THE INVENTION

The present invention relates to a chuck jaw. More particularly this invention concerns a method of making a drill-chuck jaw with hard-metal inserts as well as a chuck incorporating such jaws.

BACKGROUND OF THE INVENTION

A standard drill chuck has a body centered on and rotatable about an axis and formed with a plurality of axially extending angled guides angularly spaced about the axis. Respective jaws in these guides can be moved between a forward holding position in which they grip a workpiece and a rear releasing position. Screwthread formations on back edges of the jaws mesh with a threaded sleeve that is rotated relative to the chuck body to advance and retract the jaws. Alternately the guides are formed in a sleeve that rotates relative to the chuck body and the screwthread formations on the jaws mesh with a screwthread on the body for similar action.

Even though the jaws are made of steel, they are typically used to grip tools of similar hardness. Thus it is known to provide special hard-metal, e.g. carbide, inserts in the gripping faces of the jaws to reduce wear of the jaws and thereby prolong the life of the drill or lathe carrying the chuck.

Such inserts must be mounted very, very solidly on the chuck jaws. Once installed they must be able to withstand considerable lateral forces as the chuck applies torque to the tool, and they must hold even when the entire tool gets fairly hot as is common in machining.

OBJECTS OF THE INVENTION

It is therefore an object of the present invention to provide an improved method of making an insert-carrying chuck jaw.

Another object is the provision of such an improved method of making an insert-carrying chuck jaw which overcomes the above-given disadvantages, that is which allows the insert or inserts to be mounted very solidly in a cost-efficient and accurate manner.

A further object is to manufacture an insert-carrying chuck jaw where the gripping face of the insert is exactly positioned and not liable to shift during the service life of the chuck.

SUMMARY OF THE INVENTION

A drill-chuck jaw according to the invention is made by first forming an elongated metal body with a toothed back face and a front face, then machining a longitudinally extending groove having sides and a floor in the front face, and forming inwardly projecting and longitudinally spaced retaining bumps on the groove sides. A hard-metal insert is fitted into the groove between the retaining bumps and then bonded to the body in the groove. According to the invention the body is heat-treated, that is annealed, before machining the groove in it to reduce internal stresses. Then the body is cleaned and oiled to prepare it for machining and to eliminate any oxidation created by the heat treatment.

Furthermore according to the invention after machining the body and before fitting the insert the body is deburred and cleaned again. This leaves the surfaces of the body clean so that the bonding agent used to secure the inserts can bond directly to the body.

The insert can be bonded to the body with an adhesive. Normally the insert is bonded to the body by soldering or brazing, as such a bond is more resistant to the heat the jaw will be exposed to in use. In order to allow the insert to seat directly on the jaw and not be held off it by the solder a channel is formed between the insert and the body in the groove. The insert is bonded to the body by filling the channel with a bonding agent. The channel can be formed in the insert or in the body.

After bonding the insert to the body, the body is surface hardened, then the body can further be heat treated to increase its strength. More particularly, after bonding the insert to the body, the body is tempered to again eliminate internal stresses. Then it is polished and surface coated to prevent it from rusting.

In accordance with the invention two of the inserts are fitted to the groove at a longitudinal spacing from each other. Furthermore a transversely open blind bore is formed between the inserts and provided with a spring-loaded ball. A retaining ring is fitted to a mouth of the bore to prevent the ball from pushing out of the bore or this ball is held in place by edges of the inserts. This system is particularly usable with a battery-powered drill of the type used with a Phillips bit to set screws, for instance for dry wall. The balls also ensure accurate centering of the tool before the chuck is tightened so that during the tightening operation the jaws perfectly engage the facets of the tool.

The jaws are mounted according to the invention in angled bores of a chuck body, which is then rotated with the jaws about a center axis of the chuck body while engaging a tool with inner edges of the inserts so as to true the inner edges. In this manner the inserts are set perfectly with respect to the chuck body axis. Thus, as is necessary for a hand-tightened chuck, the jaw faces are set perfectly true to the chuck axis, regardless of how wide the chuck is open.

BRIEF DESCRIPTION OF THE DRAWING

The above and other objects, features, and advantages will become more readily apparent from the following description, reference being made to the accompanying drawing in which:

FIG. 1 is a flow diagram illustrating the method of this invention.

SPECIFIC DESCRIPTION

As seen in FIGS. 8 through 11 a drill chuck 1 according to the invention has a chuck body 2 centered on and rotated about an axis 6 and formed with a rearwardly open threaded hole 3 adapted to receive the spindle of a power unit and a forwardly open hole 4 adapted to receive a tool such as a driver bit 23. The body 2 is formed with three angled guide passages 7 each receiving a respective jaw 5.

Each jaw 5 has as shown in more detail in FIGS. 1 through 7 a rear edge formed with teeth 9 adapted to mesh with an internal screwthread of a tightening ring 10 rotatable about the axis 6 on the body 2. Rotation in one direction will move the jaws 5 axially forward into the front hole 4 to grip the tool 23 between gripping faces 8 and opposite rotation will retract them. This is all essentially standard.

In accordance with the invention each jaw 5 is provided on its front edge 12 with at least one hard-metal insert 11, here two, that themselves form the gripping faces 8. To this end the front edge 12 is formed with a longitudinally extending flat-bottomed groove 13 holding the complementarily shaped inserts 11. The groove 13 is for med on its flanks with inwardly projecting holding bumps 14 between which the inserts 11 are captured. A bonding material 15 between and around the inserts 11 secures them permanently in the groove 13.

Figure 1:
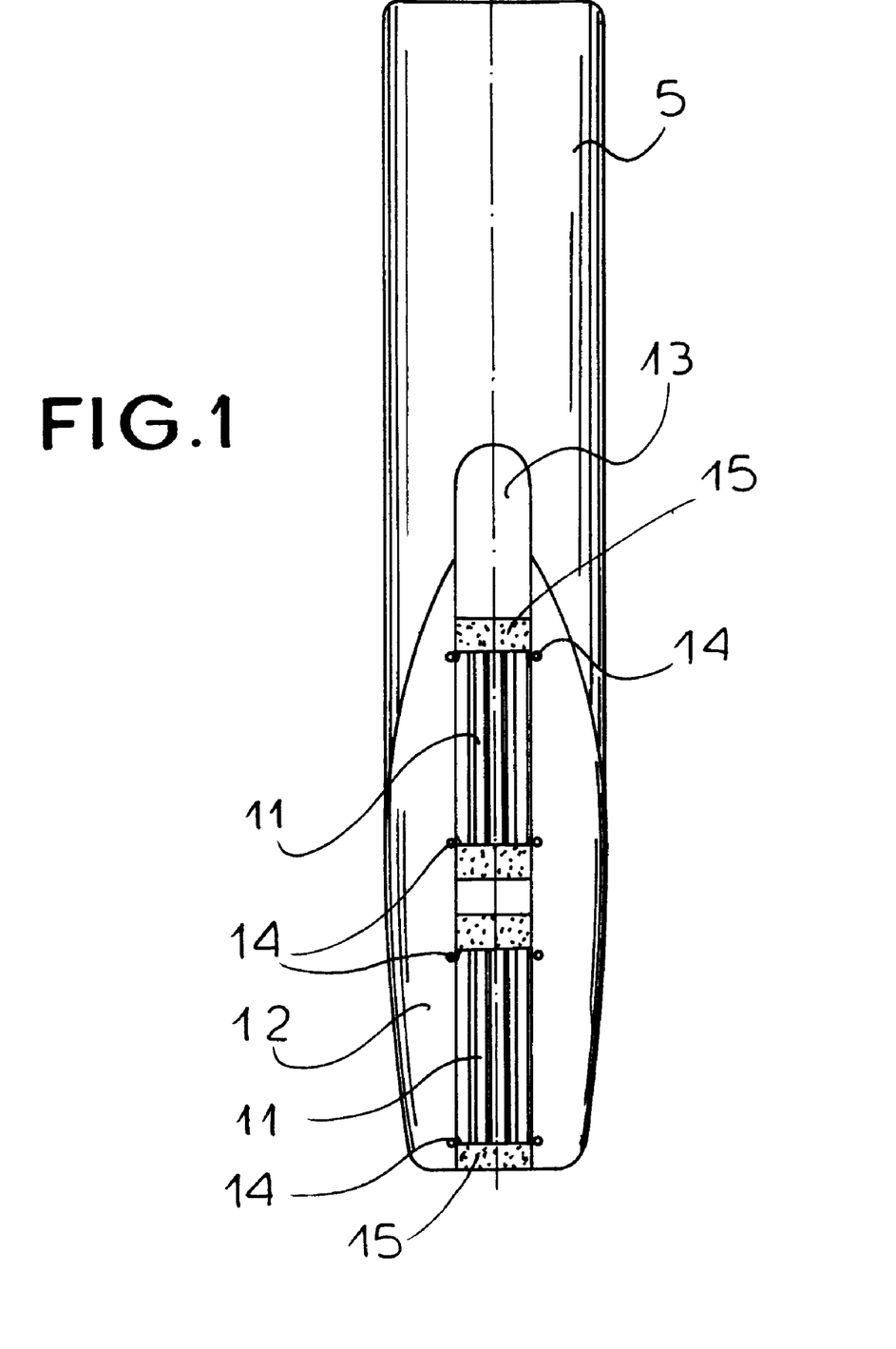
FIG. 1 is a front view of a chuck jaw according to the invention.
Figure 2:
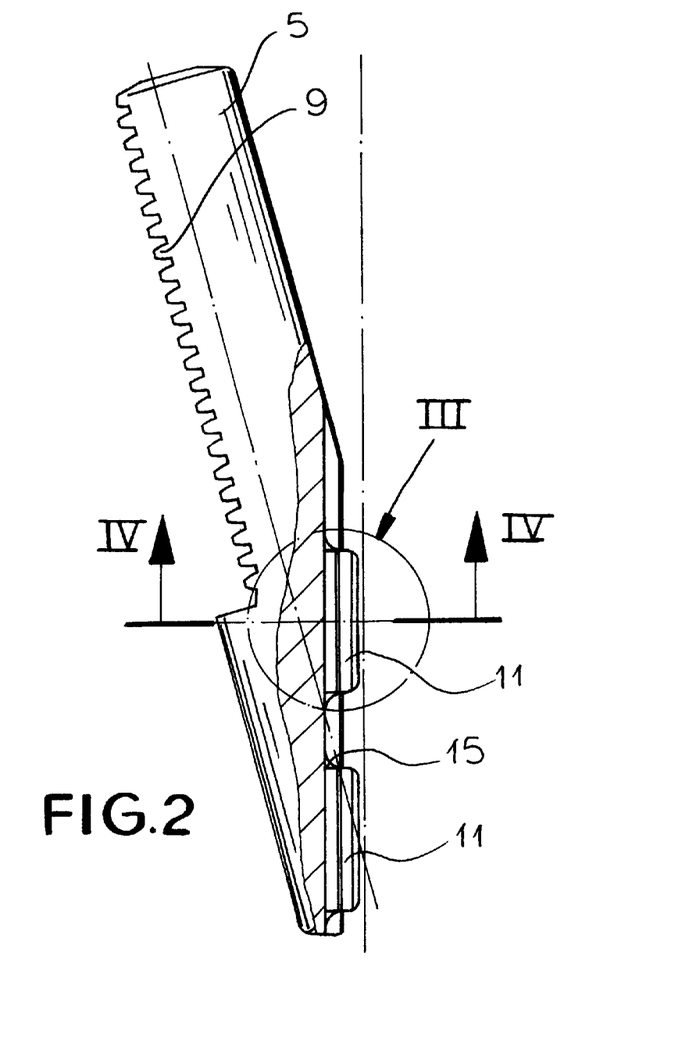
FIG. 2 is a side view partly in section of the jaw.
Figure 3:
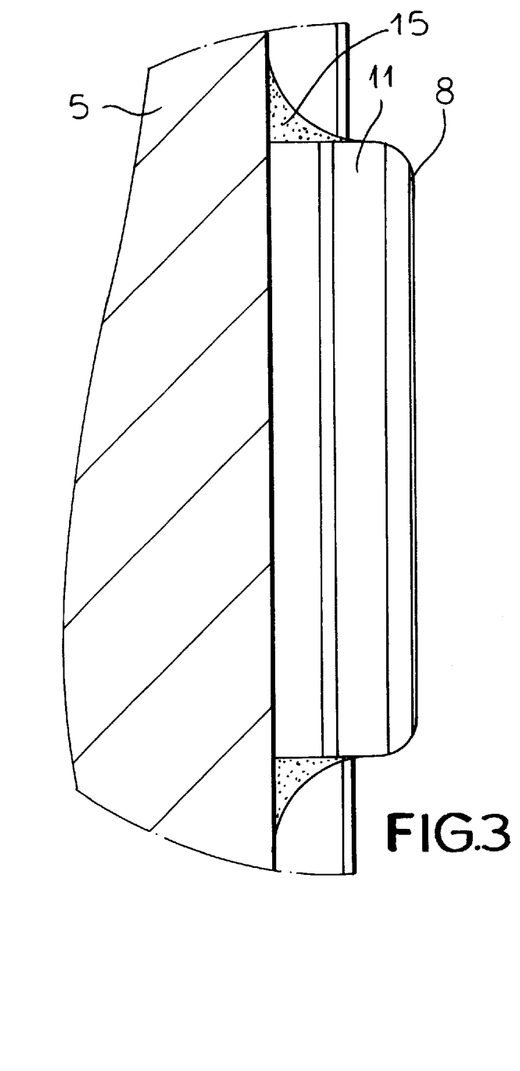
FIG. 3 is a large-scale view of the detail indicated at III in FIG. 2.
Figure 4:
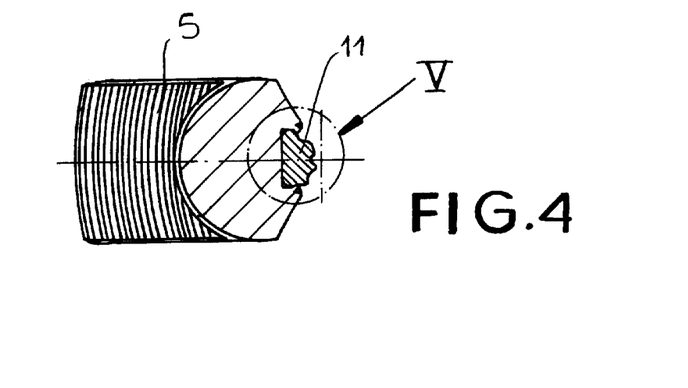
FIG. 4 is a section taken along line IV—IV of FIG. 2.
Figure 5:
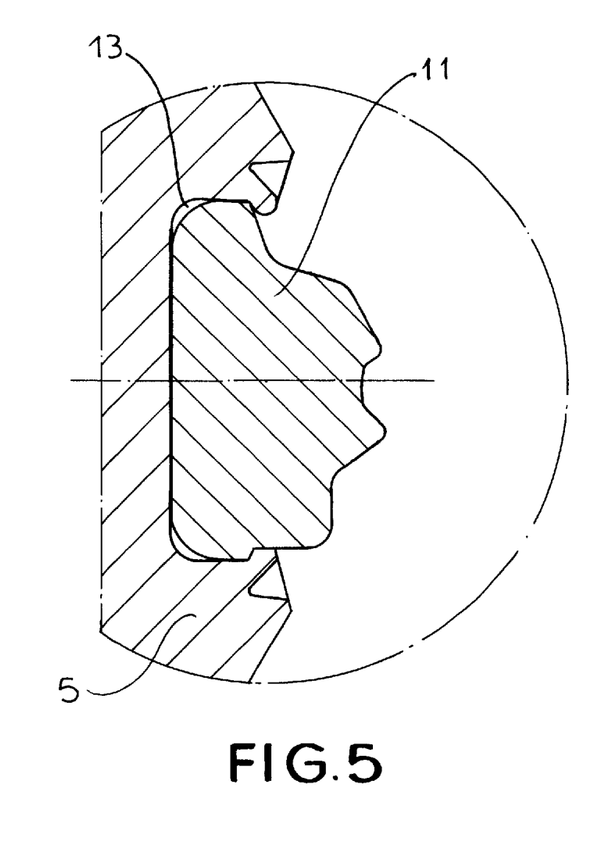
FIG. 5 is a large-scale view of the detail indicated at V in FIG. 4.
Figure 6:
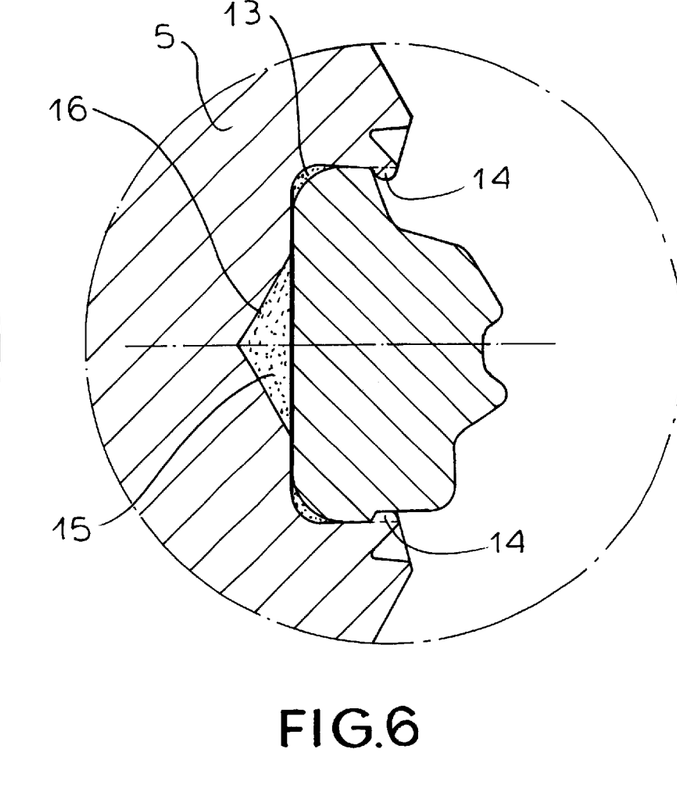
FIGS. 6 and 7 are views like FIG. 5 showing alternative forms of the invention.
Figure 7:
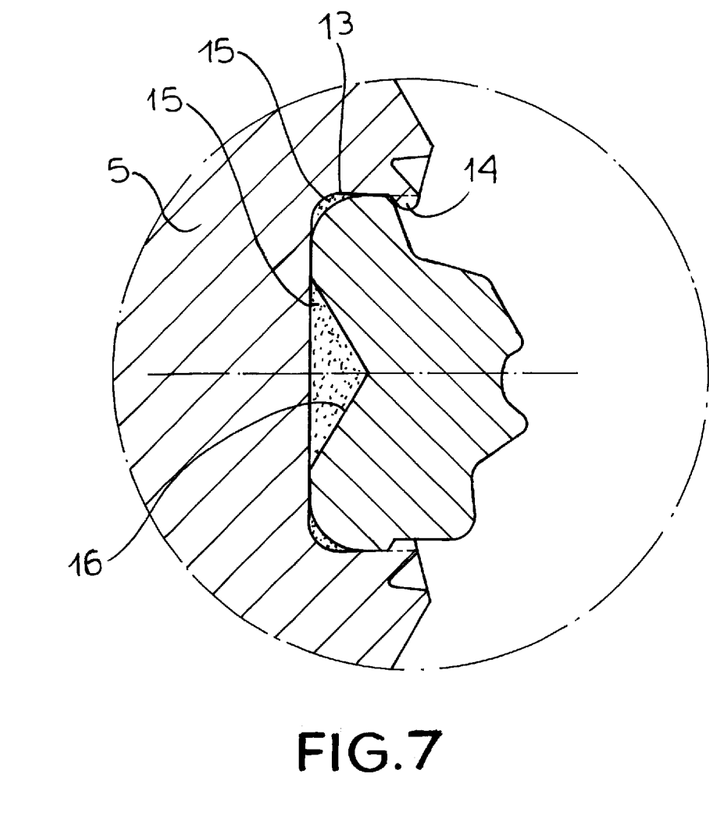
Figure 8:
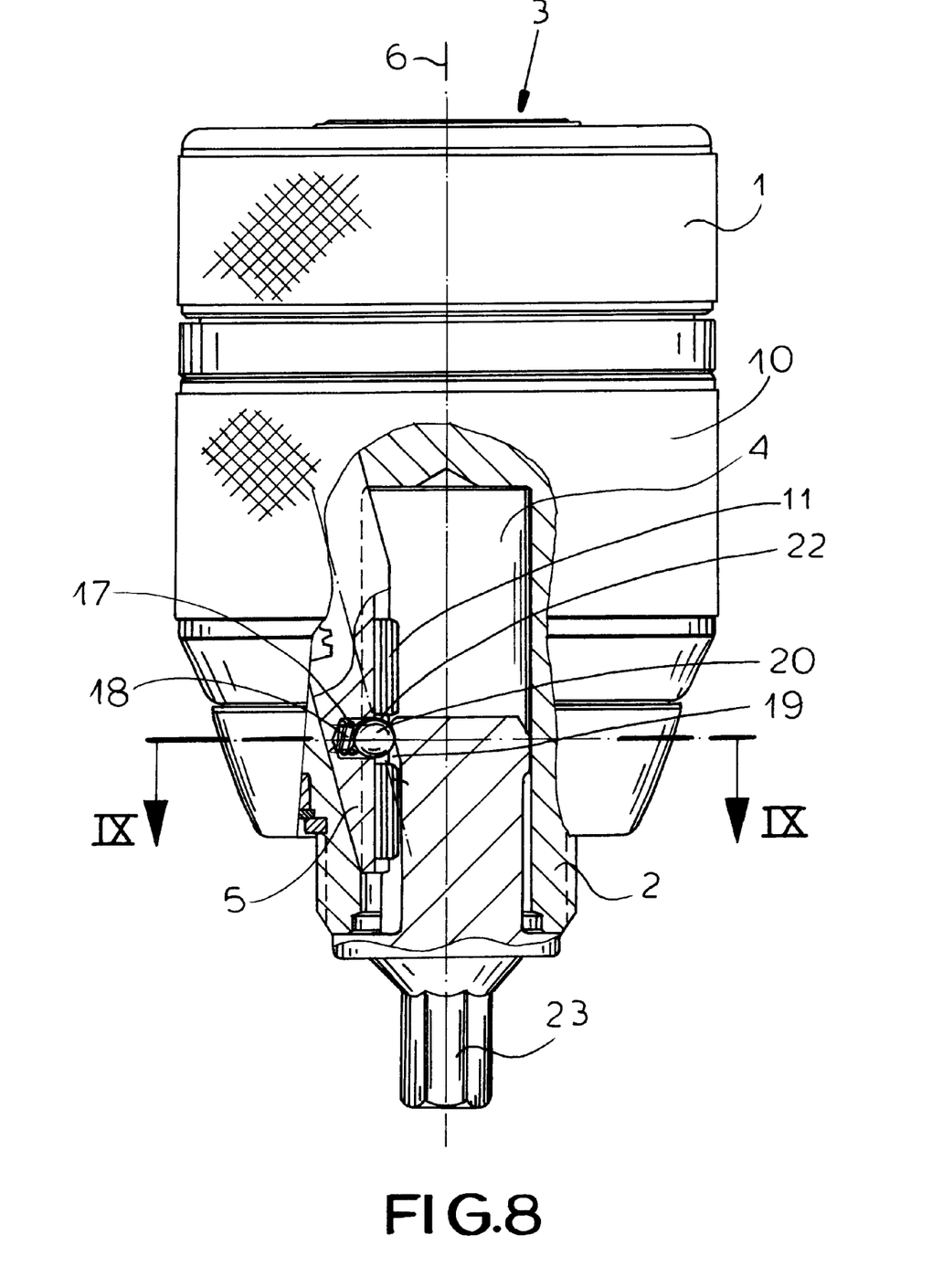
FIG. 8 is a side view partly in section of a chuck according to the invention.
Figure 9:
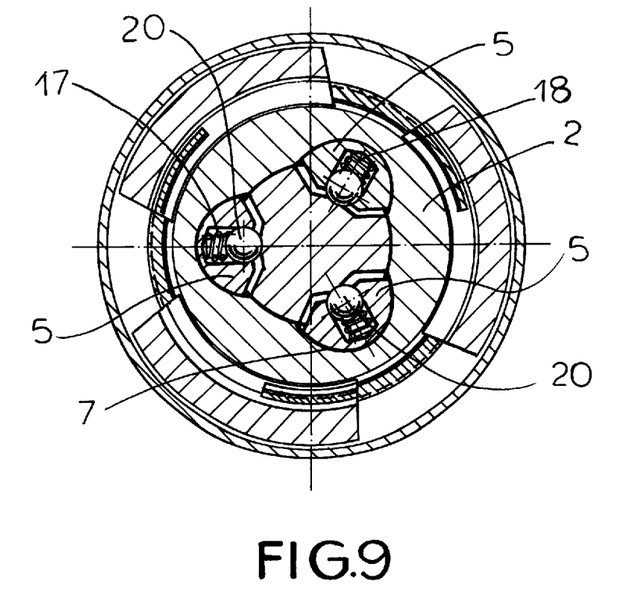
FIG. 9 is a section taken along line IX—IX of FIG. 8.
Figure 10:
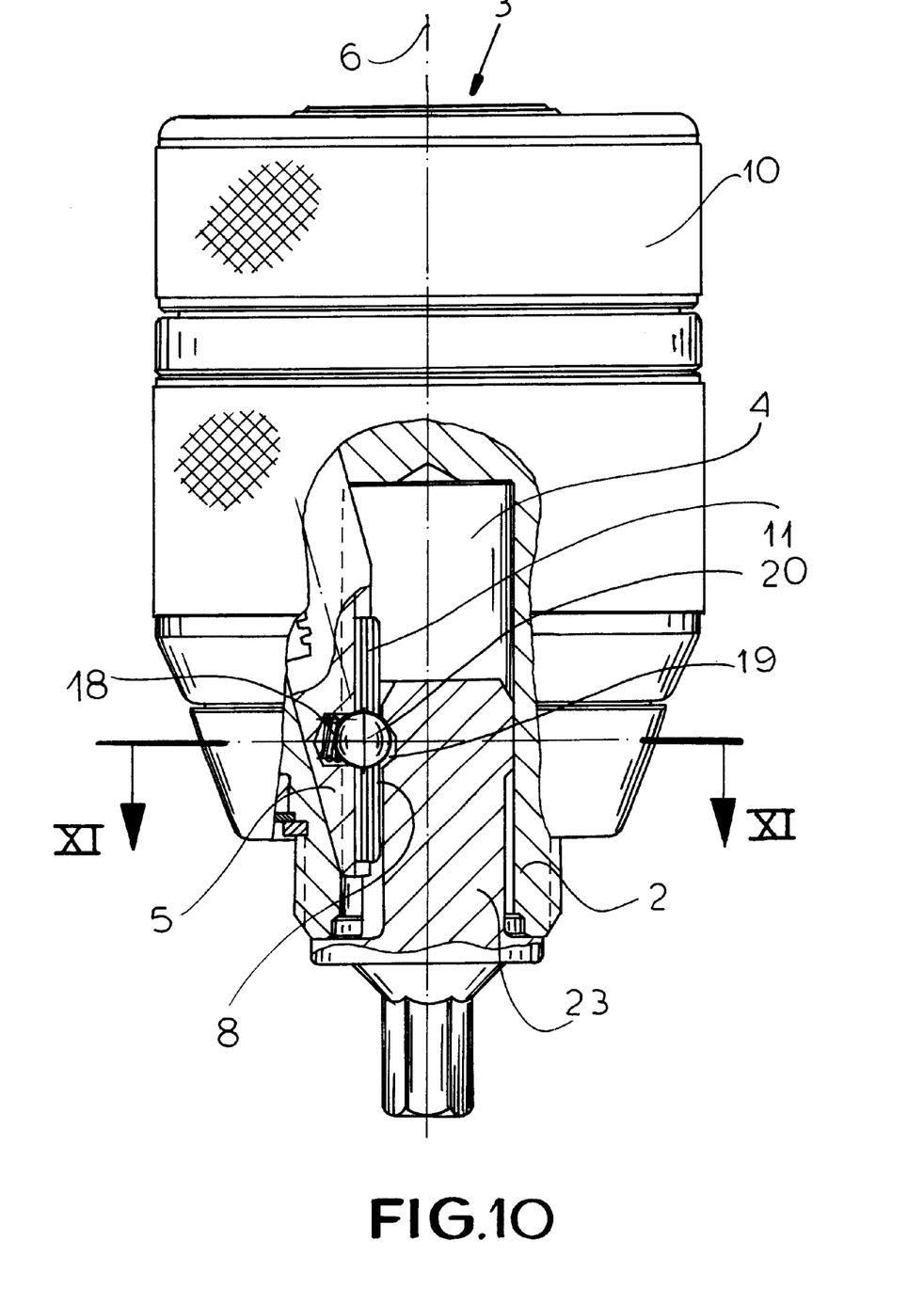
FIG. 10 is a side view partly in section of another chuck according to the invention.
Figure 11:
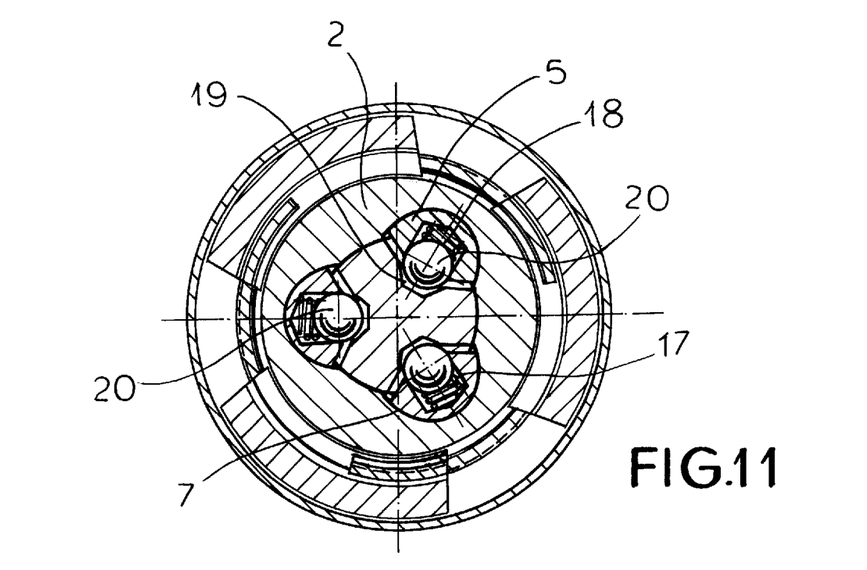
FIG. 11 is a section taken along line XI—XI of FIG. 10.
Figure 12:
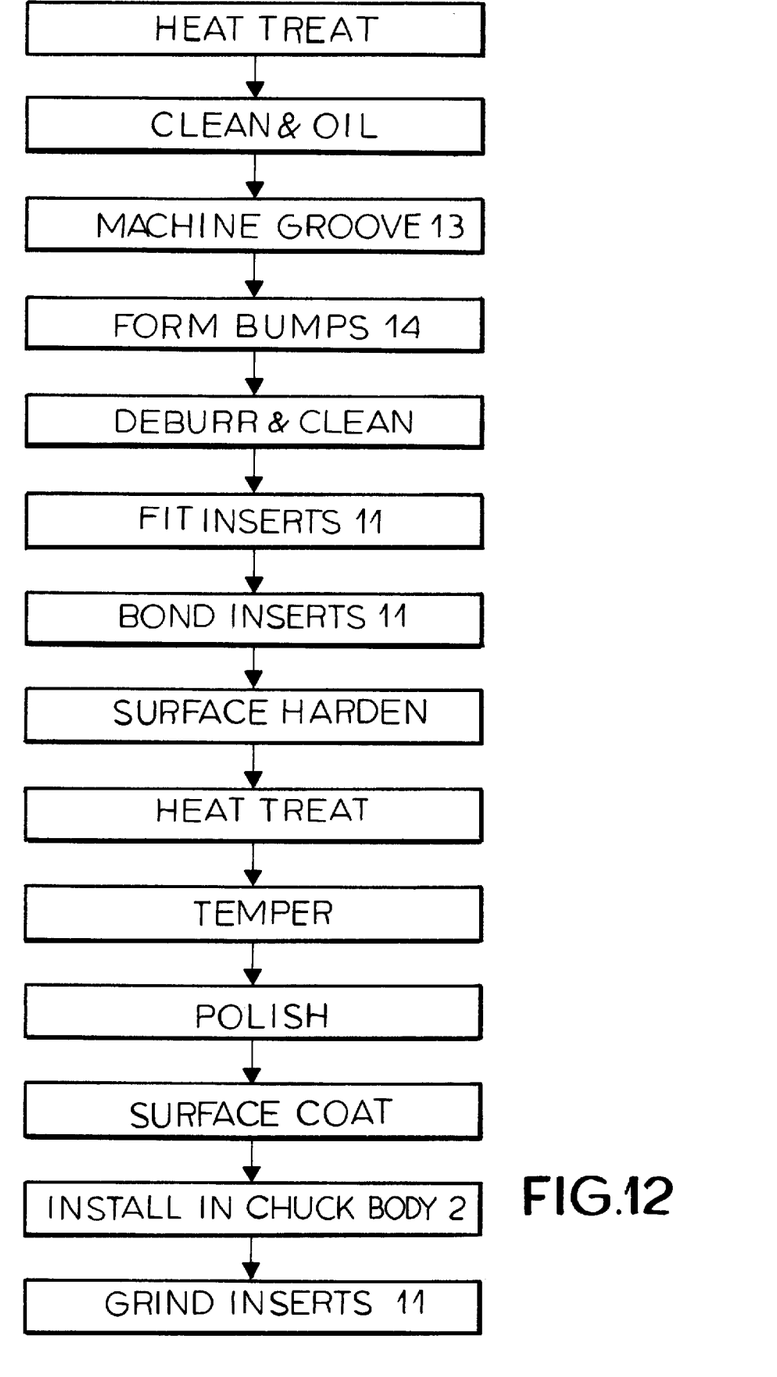

Such a chuck jaw 5 is made as shown in FIG. 12 by first heat-treating or annealing it to reduce internal stresses. Then in order to remove any oxidation from this heat-treating or annealing process the jaw 5 is cleaned and then lightly oiled. The groove 13 is then formed by milling so that the groove 13 has a floor that will eventually be perfectly parallel to the chuck axis 6. This groove floor can be formed at the same time with a channel 16 as shown in FIG. 6 and as further described below. The bumps 14 for longitudinally retaining the inserts 11 are then formed, typically simply by inwardly deforming small regions of the sides of the groove 13, and then the workpiece 5 is deburred and cleaned.

The inserts 11 are then fitted in place and a bonding agent 15 is applied. This can be a simple adhesive but normally is a solder that is drawn by capillary action into the groove 13 around the inserts 11. To ensure that the inserts 11 fit perfectly flatly on the floor of the groove 13, this floor can be formed with the longitudinally extending channel 16 as shown in FIG. 6, or such a channel 16 can be formed in advance in back faces of the inserts 11.

After bonding the inserts 11 in place by adhesive, brazing, or soldering, the jaw 3 is surface hardened and then tempered in order to increase the strength of the jaw 5 over its entire cross section. In order to relieve any internal stresses the jaw 5 is then subjected to another heat-treating or annealing process. Finally the jaw 5 i s polished and surface coated so it will not rust. Then it is installed in a chuck body 2 and its inner edge 8 is ground, for instance by rotating the chuck body 2 with the jaws 5 installed while inserting a grinding stone along As shown in FIGS. 8 through 11 a transversely open blind bore 17 is formed between the inserts 11 and is provided with a ball 20 urged into a groove 19 of the tool 23 by a spring 18. A mouth of the bore 17 is narrowed at 22 to prevent the ball from pushing out.

I claim:

1. A method of making a drill-chuck jaw comprising the steps of sequentially:

forming an elongated metal body with a toothed back face and a front face;

machining a longitudinally extending groove having sides and a floor in the front face;

forming on each of the groove sides a pair of inwardly projecting and longitudinally spaced bumps with the bumps on one of groove sides transversely aligned with the bumps on the other of the groove sides;

fitting into the groove between the pairs of retaining bumps a hard-metal insert; and bonding the insert to the body in the groove.

2. The chuck-jaw making method defined in claim 1, further comprising the step of;

annealing the body before machining the groove in it.

3. The chuck-jaw making method defined in claim 2, further comprising after annealing and before machining the body the step of:

cleaning and oiling the body.

4. The chuck-jaw making method defined in claim 1, further comprising after machining the body and before fitting the insert the step of:

deburring and cleaning the body.

5. The chuck-jaw making method defined in claim 1, wherein the insert is bonded to the body with an adhesive.

6. The chuck-jaw making method defined in claim 1, wherein the insert is bonded to the body by soldering.

7. The chuck-jaw making method defined in claim 1, further comprising the step of:

forming between the insert and the body in the groove a channel, the insert being bonded to the body by filling the channel with a bonding agent.

8. The chuck-jaw making method defined in claim 7 wherein the channel is formed in the insert.

9. The chuck-jaw making method defined in claim 7 wherein the channel is formed in the body.

10. The chuck-jaw making method defined in claim 1, further comprising the step after bonding the insert to the body of:

surface hardening the body.

11. The chuck-jaw making method defined in claim 10, further comprising the step after bonding the insert to the body of:

treating the body to increase its strength.

12. The chuck-jaw making method defined in claim 10, further comprising the step after bonding the insert to the body of:

tempering the body.

13. The chuck-jaw making method defined in claim 12, further comprising the step after tempering the body of:

polishing the body.

14. The chuck-jaw making method defined in claim 1, wherein two of the inserts are fitted to the groove at a longitudinal spacing from each other.

15. The chuck-jaw making method defined in claim 14, further comprising the steps of:

forming between the inserts a transversely open blind bore and providing it with a spring-loaded ball.

16. The chuck-jaw making method defined in claim 15, further comprising the step of:

providing a retaining ring at a mouth of the bore to prevent the ball from pushing out of the bore.

17. The chuck-jaw making method defined in claim 15, further comprising the step of:

retaining the ball in the bore by edges of the inserts.

18. The chuck-jaw making method defined in claim 1, further comprising the steps after bonding the insert to the body of:

mounting a plurality of the bodies with inserts bonded to them in respective angled bores of a chuck body;

rotating the chuck body with the jaws about a center axis of the chuck body; and engaging a tool with inner edges of the inserts while rotating the chuck body so as to machine the inner edges and true the inner edges.

19. The chuck-jaw making method defined in claim 18, where the tool is a grinding tool.

* * * * *